US012718108B2

(12) United States Patent
Gottin et al.

(10) Patent No.: US 12,718,108 B2
(45) Date of Patent: Aug. 25, 2026

(54) DRIFT FORECASTING FOR ALTERNATIVE MODEL SELECTION

(71) Applicant: Dell Products L.P., Round Rock, TX (US)

(72) Inventors: Vinicius Michel Gottin, Rio de Janeiro (BR); Herberth Birck Fröhlich, Florianópolis (BR); Julia Drummond Noce, Rio de Janeiro (BR); Ítalo Gomes Santana, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 721 days.

(21) Appl. No.: 18/170,739

(22) Filed: Feb. 17, 2023

(65) Prior Publication Data

US 2024/0281661 A1 Aug. 22, 2024

(51) Int. Cl.
*G06N 3/088* (2023.01)
*G06N 3/0455* (2023.01)

(52) U.S. Cl.
CPC ........... *G06N 3/088* (2013.01); *G06N 3/0455* (2023.01)

(58) Field of Classification Search
CPC ....... G06N 3/088; G06N 3/0455; G06N 20/00
See application file for complete search history.

(56) References Cited

U.S. PATENT DOCUMENTS

| | | | | |
|---|---|---|---|---|
| 2021/0390455 | A1* | 12/2021 | Schierz | G06N 20/00 |
| 2022/0051129 | A1* | 2/2022 | Malvankar | G06F 9/4881 |
| 2023/0124621 | A1* | 4/2023 | Umesh | G06F 21/552 726/23 |
| 2023/0129390 | A1* | 4/2023 | Fusco | G06N 5/01 706/12 |
| 2023/0376801 | A1* | 11/2023 | Rawashdeh | G06N 20/00 |
| 2024/0160939 | A1* | 5/2024 | Mopur | G06N 3/045 |
| 2024/0211544 | A1* | 6/2024 | Chatterjee | G06N 20/20 |
| 2024/0303148 | A1* | 9/2024 | Gosala | G06F 11/079 |

OTHER PUBLICATIONS

Zhao Z, Zhang H, Wang L, Huang H. A multimodel edge computing offloading framework for deep-learning application based on bayesian optimization. IEEE Internet of Things Journal. May 26, 2023; 10(20):18387-99. (Year: 2023).*

U.S. Appl. No. 17/663,423, titled "Unsupervised Learning for Real-Time Detection of Events of Far Edge Mobile Device Trajectories," filed May 14, 2022.

* cited by examiner

*Primary Examiner* — Oluwatosin Alabi
(74) *Attorney, Agent, or Firm* — Workman Nydegger

(57) ABSTRACT

One example method includes obtaining, by a central node, an evaluation of a performance of a reference model deployed at an edge node, determining if the evaluation exceeds a threshold associated with the reference model, and incrementing a counter when the evaluation exceeds the threshold, when a counter value equals or exceeds a specified limit, performing an interpolation process to identify a new model having better expected performance than performance of the reference model, and deploying the new model in a shadow mode at the edge node.

20 Claims, 8 Drawing Sheets

DRIFT FORECASTING FOR ALTERNATIVE MODEL SELECTION

FIELD OF THE INVENTION

Embodiments of the present invention generally relate to machine learning (ML) models. More particularly, at least some embodiments of the invention relate to systems, hardware, software, computer-readable media, and methods, for identifying drift in machine learning model performance, and identifying a replacement for the drifting machine learning model.

BACKGROUND

Machine learning algorithms, especially those that are used in production, are trained with certain data distributions that can change in different ways. This phenomenon is known as drift. Consequently, models may become unreliable in the presence of drifted data, requiring constant monitoring to signal drift. Among the drift detection approaches there are many that are performance-based. Such performance-based drift detection approaches may involve observing the quality of results obtained by a deployed model to determine whether the distribution of data and/or relation between features and output have changed, beyond an acceptable threshold in the domain. A typical consequence of detecting drift is to trigger the retraining of the model. If alternative models to the drifting model are available, one of those readily available models may be used instead.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
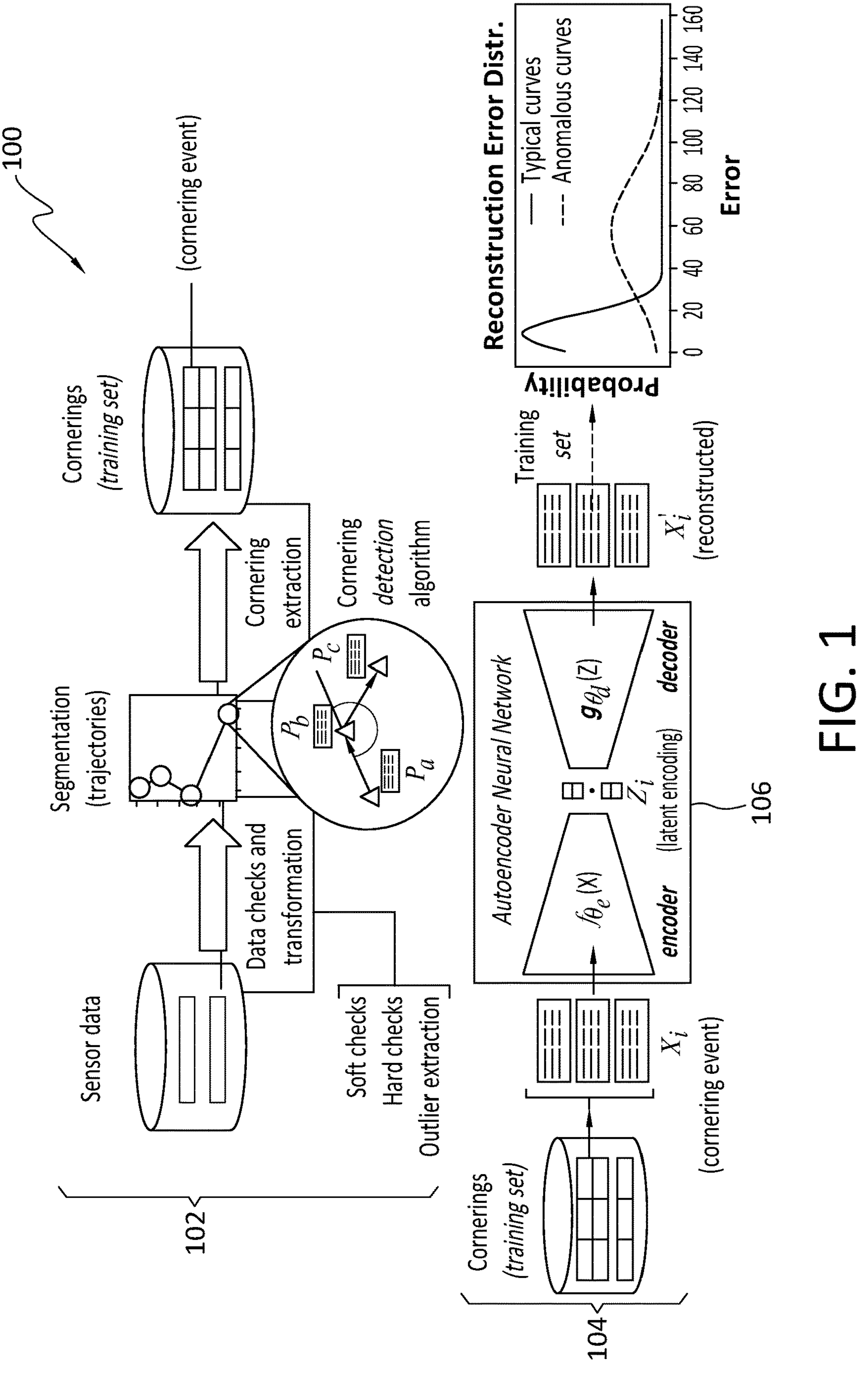
FIG. 1 discloses aspects of an example operating environment for an embodiment of the invention.

Embodiments of the present invention generally relate to machine learning models. More particularly, at least some embodiments of the invention relate to systems, hardware, software, computer-readable media, and methods, for identifying drift in machine learning model performance, and identifying a replacement for the drifting machine learning model.

In general, an embodiment of the invention may address a particular form of drift detection in which a deployed machine learning (ML) model may, over time, become less accurate than alternative models that were not fine-tuned to the domain in which the drifting model is deployed. An embodiment of the invention may comprise an offline stage, and an online stage, described below. Note that ML models may be referred to herein simply as a ‘model’ or ‘models.’

In general, the offline stage according to one embodiment may obtain baseline behavior of a reference model $M_A$, that is, the model to be deployed for inference and decision-making purposes in a particular domain, environment A in this example. The offline stage may also determine a minimal set of relevant alternative models to the reference model. As well, the offline stage may obtain parameters of the performance of those alternative models, which may number in the hundreds or thousands for example, over the data used to train the reference model, which may be leveraged in the online stage.

The online stage, according to one embodiment, may determine if/when a particular model, among the restricted set of candidate models selected in the offline stage, should be deployed in shadow mode. In an embodiment, the shadow model may supplant the reference model $M_A$, or may be considered in tandem with the reference model $M_A$. If no adequate alternative models are found, retraining of the reference model $M_A$ may be triggered.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that unacceptable drift in the performance of a model may be detected, and one or more alternative models identified that are able to provide acceptable performance in the relevant domain. An embodiment may avoid the need to retrain a drifting model. An embodiment may provide for a relatively fast hand-off from a drifting model to a different model that has better expected performance than the drifting model. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. General Aspects of Some Example Embodiments

An embodiment of the invention may be employed in a scenario in which multiple alternative versions of a reference model are available, likely each trained under distinct conditions. It may not be practical to have a large number of models deployed and operating at the same time in an edge environment, especially if many instances of the models are deployed. For example, an embodiment of an event detection model may be deployed to each mobile device, such as an Autonomous Mobile Robot (AMR) operating in an environment such as a warehouse, and these devices may have a limited capacity for computation and communication to a near edge infrastructure and, as such, may not be able to support the operation of many instances of models. Accordingly, an embodiment of the invention may operate to determine a minimal set of feasible models to be applied concurrently at one or more edge devices.

An embodiment of the invention may provide for alternative model selection under drift of a reference model. In this scenario, upon detecting drift in the reference model, it may be preferable to replace the reference model by one of the alternative models, since the alternative models may be readily available, and the retraining of the reference model may be expensive and/or take a while. A naïve, or simplistic, approach for this scenario would be to deploy all the alternative models and simultaneously assess their respective performance over time. However, operating many models in parallel may be undesirable given resource constraints at the devices where models are being employed. Furthermore, there may be a need for some orchestration that will assess the performance of the models over time to determine which model outputs are going to be used, and a delay between assessment and actuation may mean that any model swapping takes place too late. Thus, an embodiment of the invention may comprise a method for dealing with multiple alternative models when the reference model is subject to drift.

B. General Aspects of An Example Operating Environment

With particular attention now to FIG. 1, one example of an operating environment for embodiments of the invention is denoted generally at 100, and addressed in detail in U.S. patent application Ser. No. 17/663,423, filed 14 May 22, and entitled "UNSUPERVISED LEARNING FOR REAL-TIME DETECTION OF DANGEROUS CORNERING EVENTS IN FORKLIFT TRAJECTORIES FOR EDGE-LOGISTICS ENVIRONMENTS" (incorporated herein in its entirety by this reference). In general, FIG. 1 discloses an architecture and method that comprises a representation of the data checks and transformation, and cornering detection algorithm in a training stage 102 (top), and also discloses a representation 104 of the training of an autoencoder neural network, which may operate as an event detection model using anomaly detection, that minimizes the reconstruction error for the events, which may be cornering events in one embodiment, in the training set (bottom). The training stage 102, which may employ data collected at one or more near edge nodes for example, may ultimately yield an autoencoder model 106 fitted to reconstruct typical cornering events. A reconstruction error distribution may additionally be obtained for the typical cornering events in the training set. These are then deployed to each mobile entity for online decision making, leveraging the sensor data stream at the entity itself. Note that as used herein, a 'reconstruction error' embraces, but is not limited to, a difference between: [1] data input to the autoencoder, which data is then encoded by the autoencoder; and [2] the data that results when the autoencoder decodes the encoded input data. An embodiment of the invention may consider the reconstruction errors of samples observed after the model, such as a trained autoencoder for example, is deployed.

C. Aspects of An Example Embodiment

C.1 Overview of One Embodiment

An embodiment of the invention may comprise an offline stage and an online stage. In brief, the offline stage may comprise various functions, including, but not limited to: [1] obtain baseline behavior of a reference model $M_A$, that is, the model to be deployed for inference and decision-making purposes at environment A; [2] determine a minimal set of relevant alternative models to the reference model so as to obtain respective parameters of the performance of those alternative models over the same data that as used to train the reference model—which may be leveraged in an online stage. In an embodiment, the online stage may comprise various functions, including, but not limited to, determine if/when a particular model, among the restricted set of candidate models selected in the offline stage, should be deployed in shadow mode.

With the various alternative models available locally in the environment, or domain, A, which may comprise one or more edge devices for example, an embodiment may leverage the fact that the reference model may outperform the alternative ones until a significant drift occurs. The intuitive notion of an embodiment is that, typically, model $M_A$ trained with local data will perform better at the domain A until significant drift occurs. Then, one or more of the alternative models may turn out to be appropriate model, that is, a better performing model, from that point on.

More formally, an embodiment may denote $\theta(M_i)$ to refer to the distribution of the data used for the training model $M_i$, while $\theta(D_j)$ refers to the distribution of dataset $D_i$. So, for model $M_A$ for example, the distribution of the data used for training that model $M_A$ may be referred to by $\theta(M_A)$. By definition, $\theta(M_A)\equiv\theta(D_A)$ at first—but an embodiment may consider that the domain A may, over time, be subject to changes in the data distribution which may characterize the concept of drift. That is, with D denoting the data at inference time, $\theta(D)$ may drift from $\theta(M_A)$ and become closer to one of $\theta(M_B)$, $\theta(M_C)$ . . . .

A method according to one embodiment may be used to effectively determine a minimal set $\mathbb{M}^{alt}$ of models, such that $M_i \in \mathbb{M}$ are both: [1] distinct to $M_A$ with respect to their training data, that is, $\theta(M_A) \neq \theta(M_i)$; and [2] and also likely to be accurate and useful for decision making from then on, that is, $\theta(M_i) \sim \theta(D)$).

An embodiment may further determine which one, or more, of $\mathbb{M}^{alt}$ is/are most likely to perform better than $M_A$ under the current drift conditions, as established by the change in performance of $M_A$. Such model(s) may then be tested, for a limited period, operating in “shadow mode” with respect to $M_A$. With one or more models operating in shadow mode, any number of orchestration approaches may take place, depending on the domain. Both the offline stage and online stage, and respective associated operations, are described in further detail hereafter.

C.2 Example Offline Stage

Figure 2:
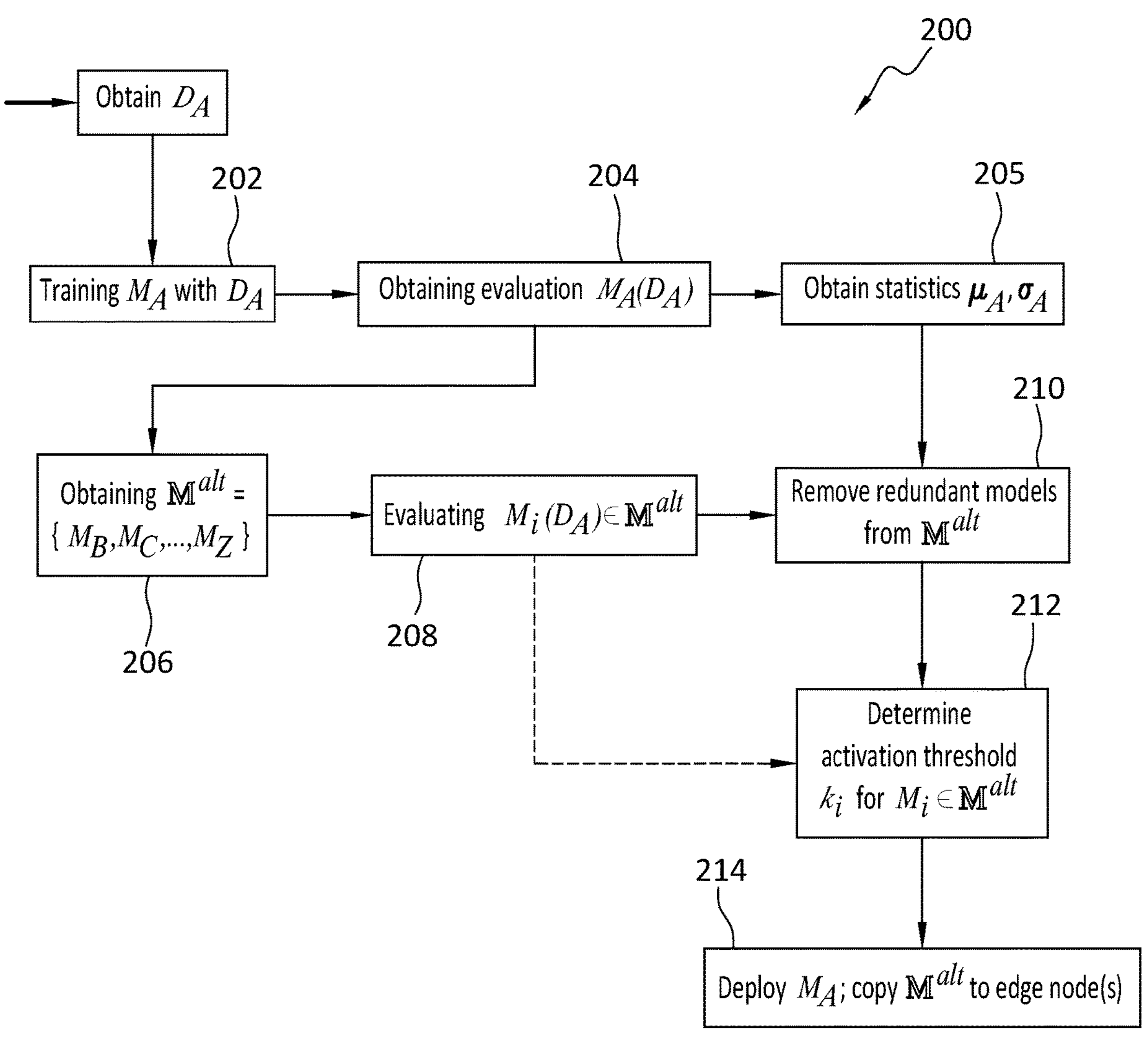
FIG. 2 discloses aspects of an offline stage, according to one embodiment.

Reference is now made to FIG. 2, which discloses various example operations of an example offline stage 200. In an embodiment, the operations in the offline stage 200 may be performed at environment A, which may be, for example, a near edge infrastructure equipped with computational resources such as, but not limited to, storage, memory, and processors. In general, an embodiment may assume that sufficient domain data, namely, data $D_A$, is available at the near edge infrastructure of environment A. In the example embodiment, this data may comprise sensor data gathered and/or generated by multiple mobile entities collected at a near-edge infrastructure. This dataset may be referred to herein as comprising ‘historical data.’

C.2.1 Training Reference Model $M_A$ with $D_A$ and Obtaining Alternative Models The historical data may be used to train 202 a model, which may be referred to as a reference model and may be deployed in the environment A. In an embodiment, this model may comprise an event detection model, but the scope of the invention is not limited to event detection models and, more generally, any other type of model, such as a model that uses an unsupervised learning approach for example, may be employed in other embodiments. An example of the deployed model is denoted $M_A$ herein. As shown in FIG. 2, an evaluation 204 may be performed of the performance of the model $M_A$ using data $D_A$, and various statistics, such as $\mu_A$ and $\sigma_A$ for example, obtained 205 concerning the evaluation, as discussed in more detail below.

Figure 3:
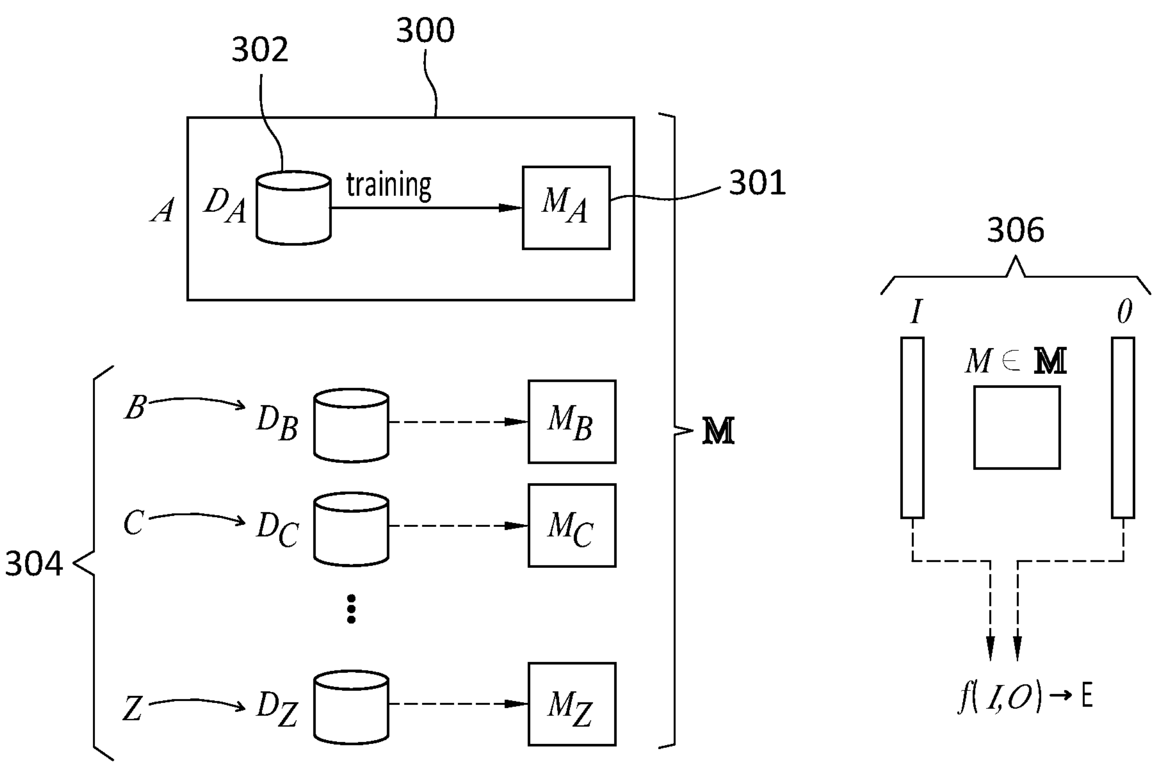
FIG. 3 discloses various versions of a model having similar structures, and each trained with different data.

With continued attention to FIG. 2, and directing attention now to FIG. 3 as well, that FIG. 3 discloses a domain 300 in which a model 301 $M_A$ is deployed, the model 301 $M_A$ possibly having been trained using the dataset $D_A$ 302. In particular, FIG. 3 discloses a scenario in which a set $\mathbb{M}^{alt}$ 304 of multiple alternative versions of the reference model 301 $M_A$ are obtained 206 (see FIG. 2), each trained under possibly distinct respective conditions, but all sharing a common structure, that is, all directed to resolution of the same general problem. The models in the set $\mathbb{M}^{alt}$ 304 may be selected 206 based on the outcome of the evaluation 204. For example, and as discussed elsewhere herein, the models in set Malt 304 may be selected based on the similarity of their performance to the performance of $M_A$ ($D_A$). The models M in the set $\mathbb{M}^{alt}$ 304 may or may not be obtained from other sources than the environment A. For example, a model M may be obtained from a different domain, such as another edge device or near edge environment for example, than the domain 300 in which $M_A$ 301 is deployed.

In an embodiment, and as shown at 306, all of the models $M \in \mathbb{M}$ may be instances of the same structure, with input I and output O. FIG. 3 also discloses evaluating 208 (see FIG. 2) the various model instances using an evaluation function $f$ which yields, for a particular input sample I, and possibly output O, an evaluation score E of the performance of the model for that case.

One example scenario according to an embodiment may be as follows:

models M are autoencoder models for event detection in sensor streams, and/or another function;

in that sense, the ‘reference model’ $M_A$ may be one trained locally with historical data of a particular near-edge infrastructure at a domain A, such as a warehouse;

the alternative models $M_B$, $M_C$ ... $M_Z$ may then comprise the respective similar models trained at different respective domains, using data gathered at those domains; and the score of the model with respect to a sample is the reconstruction error for that sample, where smaller scores correspond to better performance than the performance associated with larger scores.

An embodiment may be applied to other kinds of ML models, though one particular embodiment may be directed to an autoencoder model for event detection, due to the desirable characteristics of an autoencoder model, such as that the autoencoders may enable an embodiment of the invention to perform an assessment of the quality of the models, without the need for supervised data, in a straightforward and immediate manner, such as by computing the reconstruction errors of the autoencoder models with regard to the input samples received by the autoencoder models.

An embodiment may consider that the, presumed, datasets $D_B$, $D_C$ . . . $D_Z$ respectively used for training models $M_B$, $M_C$ . . . $M_Z$ may not be able to be communicated to the computational structure at the domain 300, such as due to privacy or communication costs, or due to not being readily available, such as may be the case if those datasets are discarded after the training of the respective models with which they are associated.

Figure 4:
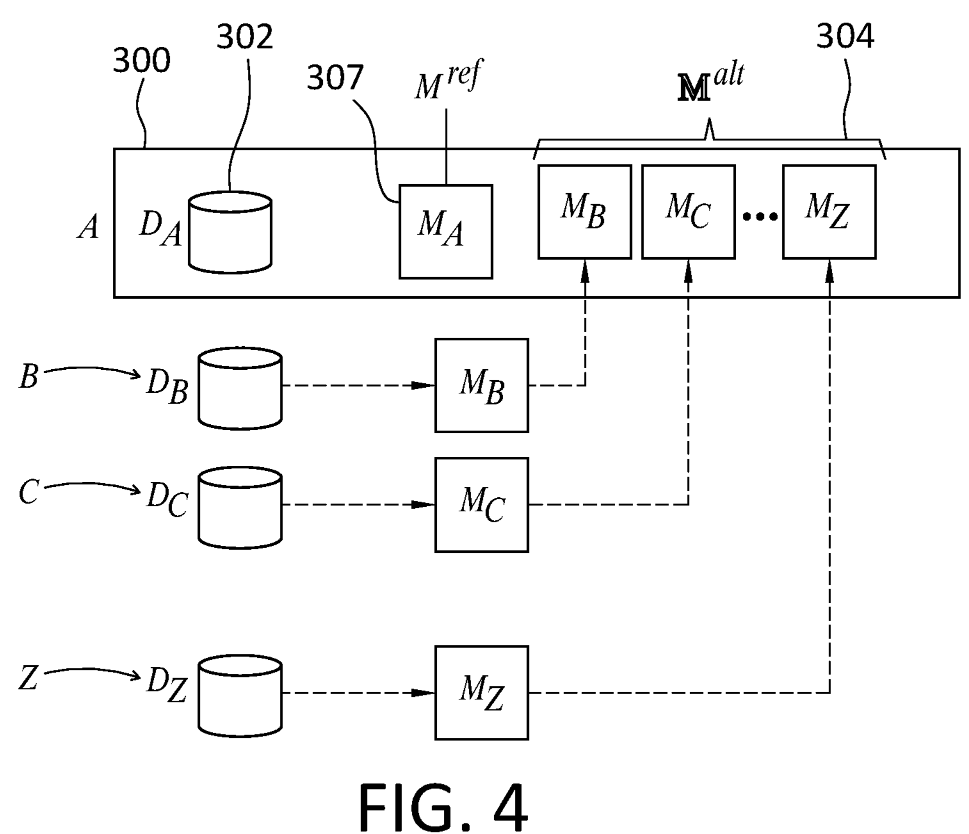
FIG. 4 discloses aspects of a set of alternative models, according to an embodiment.

The models $M_B$, $M_C$ . . . $M_Z$, that is, the models in set $\mathbb{M}^{alt}$ 304, may on the other hand, may be reasonably communicated to the domain 300, since those models may likely be available in production at environments B, C . . . Z, respectively. This is disclosed in FIG. 4. Particularly, FIG. 4 discloses that the models in set $\mathbb{M}^{alt}$ 304 are communicated to the domain 300. In this example, the model $M_A$ 301 is considered the reference model $M_{ref}$ 307. In an embodiment, data compression techniques may be applied to the models in set $\mathbb{M}^{alt}$ 304 to enable those models to be readily transferred to the domain 300.

C.2.2 Model Evaluation and Baseline

With these models in set $\mathbb{M}^{alt}$ 304 locally available, that is, at the domain 300, an embodiment may operate to obtain baseline performances of the models under the conditions in the domain 300. This may comprise, as shown in FIG. 2, evaluating 208 (see FIG. 2) the performance of the models using the locally available dataset $D_A$. This is disclosed in more detail in FIG. 5, which generally discloses an example comprising the evaluation $M_i$ ($D_A$) of each model $M_i$ with respect to the historical data $D_A$ (left) 502, and the respective distributions (histograms) of evaluations for each respective model (right) 504.

Figure 5:
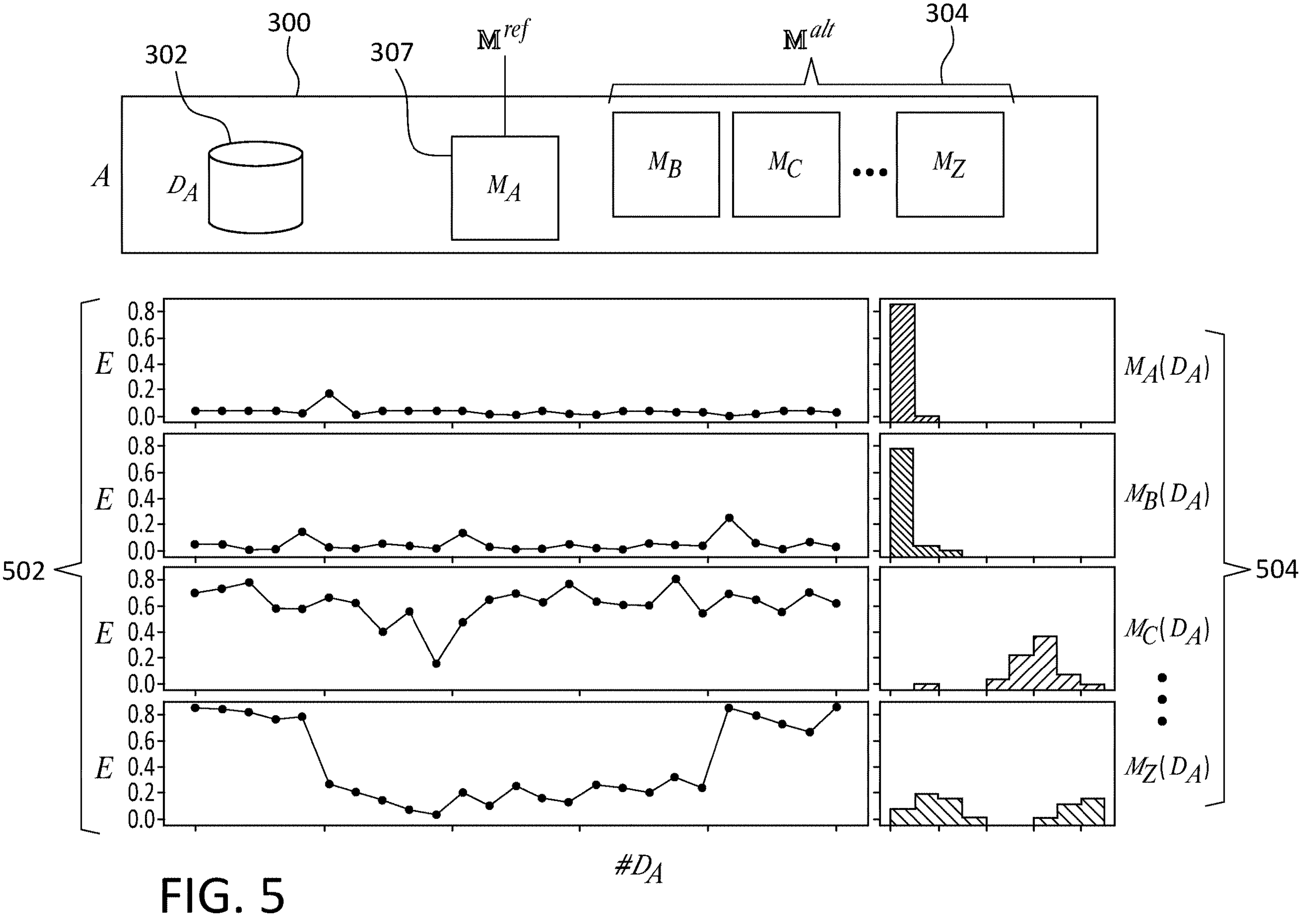
FIG. 5 discloses performance information generated for each model in a group of models, according to an embodiment.

Note that the scores E in the FIG. 5 follow an example embodiment of autoencoder models, with smaller scores meaning best performance. Typically, as shown in the FIG. 5, model $M_A$ may have good performance, since it was trained with $D_A$. The performance of the other models may vary: model $M_Z$ varies from bad scores (high errors) to good scores (low errors), signaling that in some portions of $D_A$, the underlying distribution was more similar to the distribution in the presumed dataset $D_z$ used in its training; model $M_C$ is consistently worse than other models, and the reference model $M_A$ in particular—this may typically be the case for models trained under significantly different conditions than those at environment A, that is, domain 300, where the reference model $M_A$ was trained; finally, model $M_B$ performs very well, yielding an average performance comparable to that of the reference model $M_A$.

Note that these performances, as reflected in the scores E, are relative to the historical data at the environment—that is, the data $D_A$ that were used to train model $M_A$. An embodiment may ultimately consider a situation of drift—that is, the underlying distribution of those data will change in the domain during online operation. Hence, a difference in performance from the baseline performance of the reference model may be used to determine alternative models likely to perform better under a drifted condition.

With continued reference to FIG. 5, and particularly for the reference model $M_A$, an embodiment may extract 205 (see FIG. 2) statistics of baseline performance. These may comprise the mean HA and standard deviation JA of the performance scores E for all samples in $D_A$, but additional, or alternative, descriptive statistics may be employed in other embodiments. In an embodiment, redundant models may be removed 210 (see FIG. 2) from the set $\mathbb{M}^{alt}$ 304, as discussed in further detail below. For example, because the performance of model $M_B$ closely conforms with that of $M_A$, the model $M_B$ may be considered redundant since if $M_A$ drifts, it may be expected that $M_B$ would drift correspondingly. The statistics mean $\mu_A$ and standard deviation $\sigma_A$ may be used to determine a baseline performance threshold k, such as, $k=\mu_A+\sigma_A$.

Notice that this considers the case of the example in which the performance of the models is given by an error score E and, therefore, the threshold may represents a maximum permissible reconstruction error. In alternative embodiments, if the evaluation of the models is given by a positive score E, the threshold $k_i$ may be adapted to represent a minimum allowed score.

Further, for each alternative model $M_i \in \mathbb{M}^{alt}$, an embodiment may determine 212 (see FIG. 2) an activation threshold $k_j$. This threshold may be used, during the online stage, to determine which alternative models are most likely to perform well under a drift condition. The threshold $k_i$ may be defined with respect to statistics of the performance of the model $M_i$ over $D_A$, similarly to the baseline performance threshold k. That is, typically, the threshold $k_i$ may be defined as the mean performance of model $M_i$ over $D_A$. Notice that the assessment of model performance may be performed in offline fashion, and that not all alternative models may be active during online usage, that is, when real-time inferencing is being performed, due to resource constraints, as noted earlier herein.

At 214 (see FIG. 2), the reference model $M_A$ may be deployed at an edge node for use in production, or online, operations. As well, the models that remain in $\mathbb{M}^{alt}$ may likewise be deployed to each of the edge nodes, for use as shadow models, as discussed elsewhere herein.

C.2.3 Candidate Models Selection

An embodiment may identify, based on the analysis of the performance of the reference model, which alternative models are likely to be applicable in a particular domain or domains, that is, a set of candidate models. This step may be important to reduce the number of alternative models $\mathbb{M}^{alt}$ to enable the online orchestration operation to be implemented with minimal computing resource overhead.

In an embodiment, two criteria may be used to discard 210 (see FIG. 2) candidate models, and both criteria may be based on an analysis of similarity of baseline performance between models. For example, and as noted earlier, all alternative models $M_i \in \mathbb{M}^{alt}$ whose baseline performance is too similar to the reference model $M_A$ may be discarded. This is the example of model $M_B$, in the example of FIG. 5.

The underlying reasoning is that these models are most likely trained under similar conditions to the reference model, and therefore are likely to be subject to the same performance decay under similar drift conditions. More generally, all alternative models $M_i \in \mathbb{M}^{alt}$ whose baseline performance is too similar to another reference model $M_i$ may be discarded. The reasoning is similar as for the case of $M_B$, but with respect to two alternative models which are likely redundant with respect to each other.

One approach for this determination may comprise obtaining the distributions of the performance metrics E for each model, such as are represented by the histograms 504 in FIG. 5, and then applying a suitable distance function between distributions, such as a Wasserstein distance. Then, a threshold of minimum distance may be defined so that models whose distances are too small may be considered redundant. A discussion is provided below concerning the orchestration, by one embodiment, of the deployment of one or more of the resulting candidate models in 'shadow mode' for online assessment. For simplicity, and to highlight that the pruning of alternative models may be optional, the candidate models may also be referred to as $\mathbb{M}^{alt}$ in the discussion below.

C.3 Example Online Stage

Figure 6:
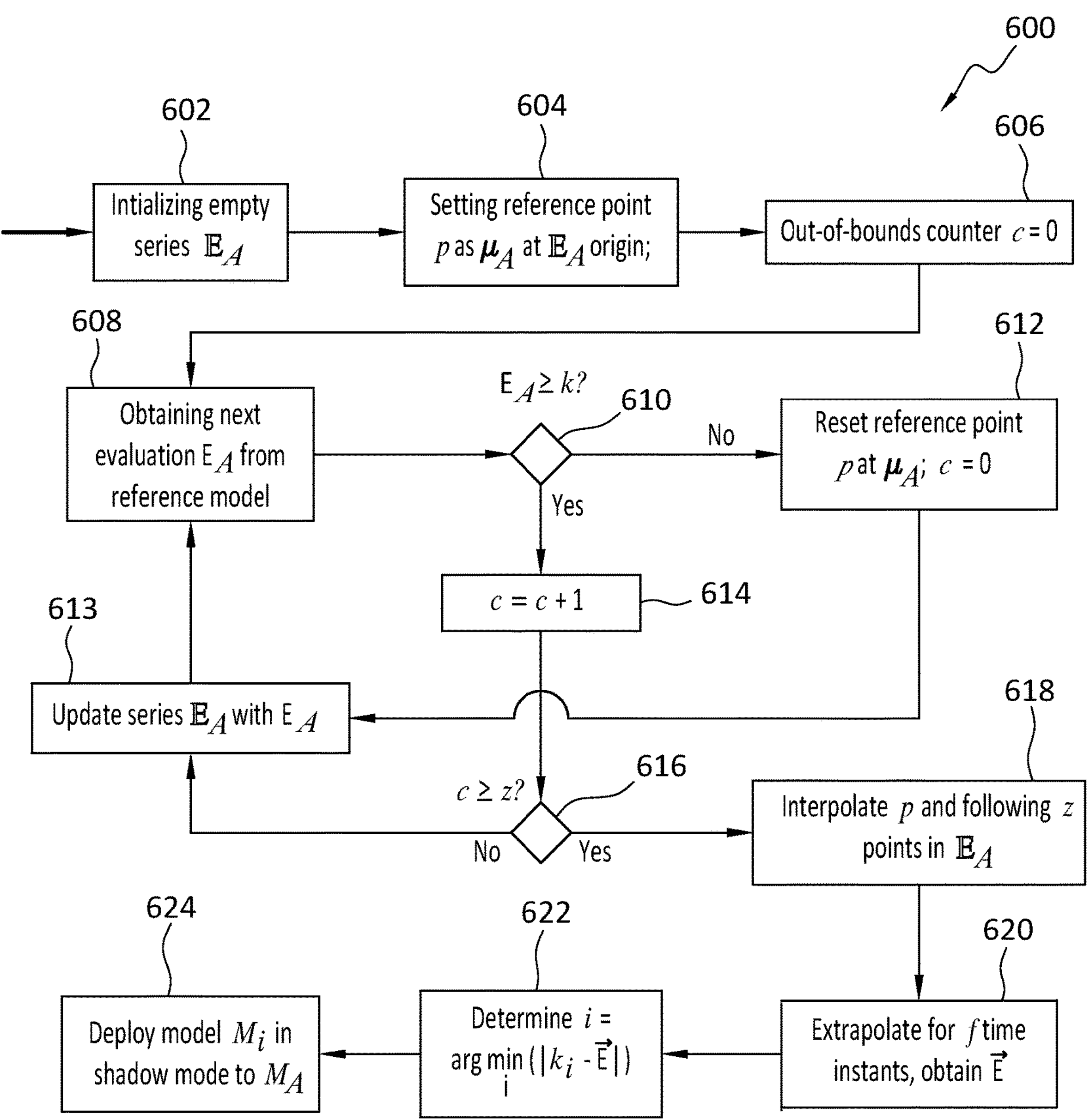
FIG. 6 discloses aspects of an online stage, according to one embodiment.

An example online stage according to one embodiment is disclosed in FIG. 6 which among other things, comprises a method 600 for determining the best shadow model(s) to be used in a particular set of circumstances. In general, the operations of the method 600 may be performed at a particular edge node in the environment such as, for example, a far-edge node at which the model $M_A$ may be deployed for inferencing.

C.3.1 Initialization and Evaluation Assessment

Figure 7:
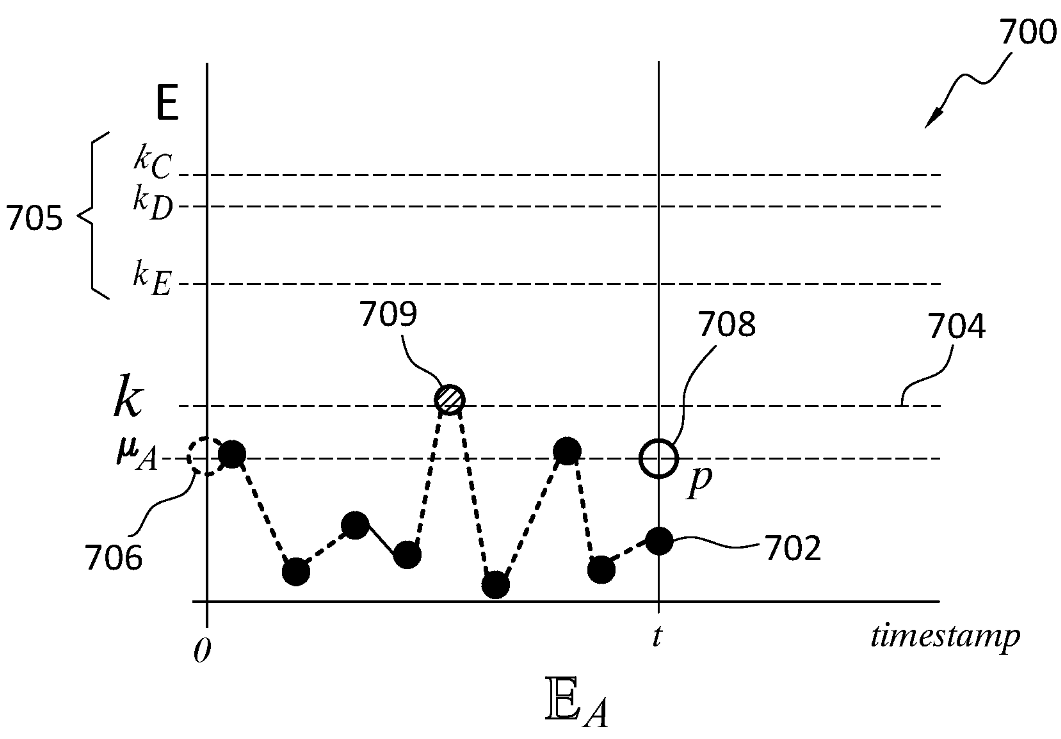
FIG. 7 discloses performance samples of a model, according to an embodiment.

An embodiment of the method 600 may begin with initializations of control structures and variables, namely, in this example: [1] a series $\mathbb{E}_A$ of performance evaluations for inferences of the reference model with current data D; [2] a reference point p, later used for forecasting drift changes via interpolation, initially set 604 at the origin of the series—particularly, the reference point p may be initialized as an average performance of $M_A$, so as to serve as a starting point for an interpolation process, examples of which are discussed below in connection with FIG. 9; and [3] a counter may be set 606 for a number of sequential evaluations in $E_A$ that are above the threshold k of maximum reconstruction error. Note that the method 600 of the online stage may be applied concurrently to the typical operation of the reference model $M_A$ deployed to the domain A. That is, new evaluations $E_A$ for newly observed samples may be obtained over time as the model $M_A$ operates in domain A. FIG. 7 discloses an example state, represented as a graph 700, in which few samples have been observed, that is, FIG. 7 discloses a graph 700 of the performance of the model $M_A$ over time.

Particularly, FIG. 7 discloses that a sample score, or evaluation E 702, below the activation threshold k 704 has been obtained 608 (see FIG. 6) and is observed as having occurred at timestamp t. Note that in this example, the activation threshold k is applicable to the reference model $M_A$, but FIG. 7 also discloses the activation thresholds $k_C$, $k_D$, and $k_E$ collectively denoted at 705, for models $M_C$, $M_D$, and $M_E$, assuming for this example that these are the candidate models selected previously. Because, in this example, the sample evaluation E 702 is determined 610 to be below the activation threshold k, or simply the 'threshold,' the reference point p 706 may be reset or updated 612 to the standard value, as shown at 708. Note that a counter value of c=0 at 612 indicates that no sequence of samples is currently observed above the activation threshold k. Note that after 612, the method 600 may then update 613 the series $\mathbb{E}_A$ of performance values to include $E_A$.

Figure 8:
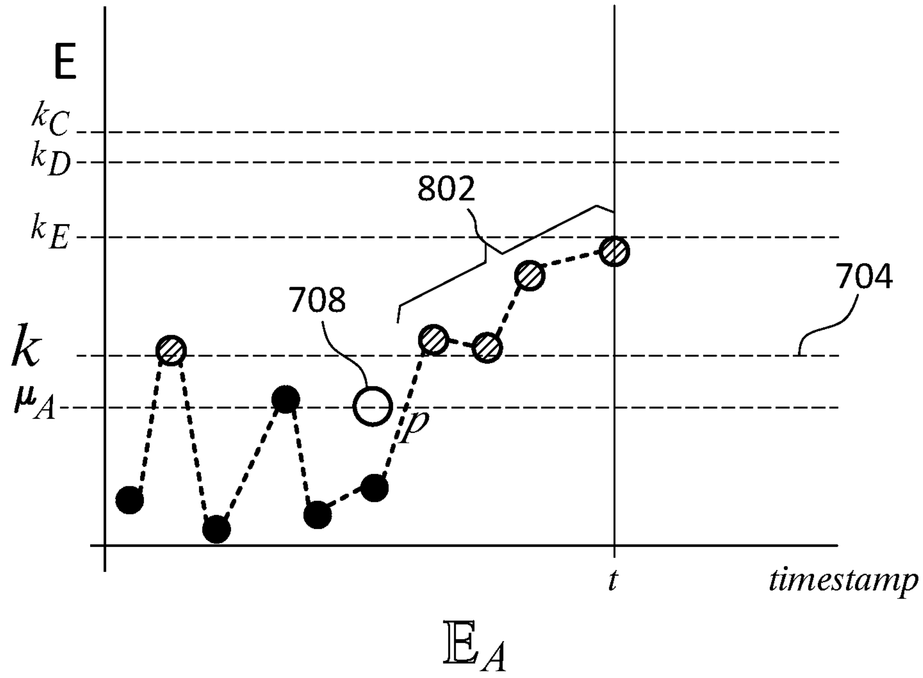
FIG. 8 discloses model performance as of a new timestamp, according to an embodiment.

Note that in the example method 600 of FIG. 6, the element 610 may comprise a monitoring mechanism which may make a determination that the reference point 706 is reset when the evaluation of a sample evaluation is found to be below the threshold. In FIG. 7, the original reference point is denoted at 706, at the origin of the graph 700, and the updated reference point 708 at timestamp t. The monitoring implemented at 610 may also determine that the counter c is incremented 614 as sequential evaluations are identified that are above the baseline threshold k 704. As noted earlier, when a sample is found to be below the threshold the counter resets to zero 612. Hence, in the example of FIG. 7, the counter c=zero even though a single previous sample 709 was observed above the threshold 704. With reference now to FIG. 8, there is disclosed an example case in which a few sequential samples have been determined to be above the threshold 704.

In particular, FIG. 8 comprises a graph 800 that discloses an update that has occurred, at a new timestamp t, relative to the circumstances of FIG. 7. In FIG. 8, the reference point 708 is unchanged and the counter c=4, which reflects that four observations 802 have occurred, since the time t of FIG. 7, where the observations were above the threshold 704. A monitoring mechanism 616 (see FIG. 2) may determine in this illustrative example that a number z of consecutive evaluations above the threshold k is allowed before the model $M_A$ will be considered to have a possibly unacceptable level of drift. This is in line with the idea that some level of hysteresis/abnormality may be considered, in an embodiment, to avoid spurious detections, namely, false positives, without having to increase the threshold 704 significantly. For example, a hysteresis of (k)×(0.1) may be acceptable in an application. Note that if it is determined 616 that the counter c≤z, the method 600 may return to 613. On the other hand, if it is determined 616 that the counter c≥z, then an interpolation process 618 may be performed, as discussed below in connection with FIG. 9.

That is, in an embodiment, when the counter reaches z, a forecasting process may be triggered, relying on a simple interpolation 618 of p and the z last evaluations. One example approach for interpolation is disclosed in the graph 900 of FIG. 9. More particularly, FIG. 9 discloses an example of the interpolation of p and z last evaluations 901 (4 values in the example of FIG. 9), extrapolated 620 (see FIG. 6) for f time instants, resulting in a forecast evaluation $\vec{E}$.

In an embodiment, the interpolation approach may comprise a simple linear interpolation between p and the last of the z points 901. This is the case shown in the line denoted at 902 the FIG. 9. Alternatively, if knowledge of the drift modes in the domain is available, especially regarding the drift magnitude of concept drift scenarios, other interpolation functions, such as logarithmic least-squares fitting for example, may be used instead. This example case is represented in the line 904 in FIG. 9. As shown in the example, alternative interpolation functions will yield varying results. An embodiment may assume that the most appropriate interpolation function may be defined with domain knowledge by an external source. Note that in alternative embodiments, additional past points, that is, other than just the z most current evaluations, may be used for the interpolation function.

Figure 9:
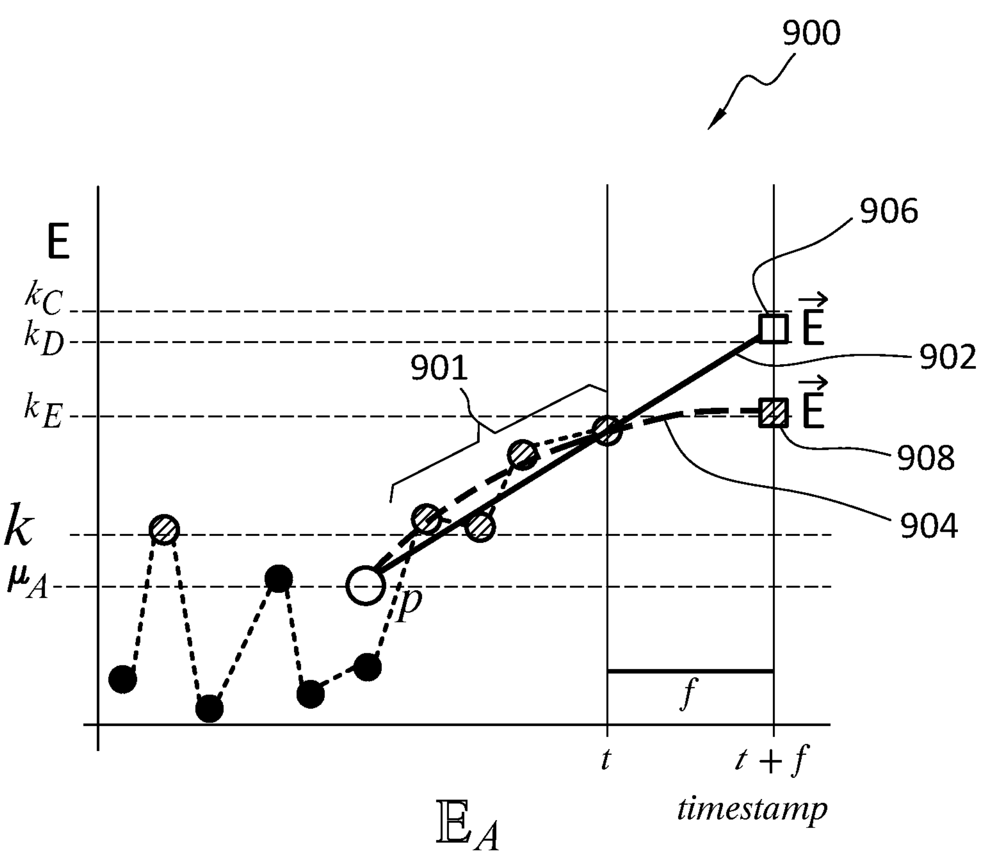
FIG. 9 discloses example interpolation processes, according to an embodiment.

In general, an interpolation process, as exemplified in FIG. 9, may comprise an interpolation from the mean performance of the model. Thus, the points 906 and 908 in FIG. 9 is the forecasted evaluation values for the model, using the respective interpolation approaches 902 and 904, and based on the model behavior collectively reflected by the points 901. As shown in FIG. 9, the point 906 is above the threshold $k_D$ and the point 908 is above the threshold $k_E$. Thus, depending on which type of interpolation is employed, the model $M_D$ and/or the model $M_E$ may be selected to run in a shadow mode, as discussed below.

C.3.2 Shadow Model Selection

Regardless of the interpolation function employed, an embodiment may determine a forecast evaluation $\vec{E}$. This value may represent an expected evaluation of the reference model in the future if the ongoing drift continues to build. Therefore, an embodiment may compare 622 (see FIG. 6) the forecast evaluation to the respective activation thresholds of the alternative models. Intuitively, it may be expected that models that performed with a certain level of deviation in the historical data DA to be likely applicable, that is, to provide acceptable performance, in situations of comparable deviation. Note that there is no guarantee that any given model(s) will perform well and, in an embodiment, the shadow model selection process may simply comprise the selection of a most likely, given the aforementioned, alternative model(s) to perform accurately given a scenario comprising drift.

As such, an embodiment may deploy 624 (see FIG. 6) the model(s) in shadow mode with respect to the reference model. This may comprise activating the shadow model(s) in tandem with the reference model. Formally, an embodiment may obtain the index of the model i, that is, the index of the model in an array of models, whose activation threshold $k_i$ is closest to the forecast evaluation $\vec{E}$, such as 906 or 908, obtained by extrapolating the trend for f instants into the future. In alternative embodiments in which multiple shadow models may be deployed, a suitable process for determining the n models with the closest activation thresholds to the forecast evaluation may be employed.

The shadow model(s) may be employed in various ways. For example, a shadow model $M_i$ may supplant $M_A$ completely. In this case, the reference model may be removed, and the inferences provided by the alternative model may be considered for decision making purposes, possibly with the consideration that the results are unreliable, since the model $M_i$ is not necessarily guaranteed to perform accurately.

In another approach, the shadow model(s) may be considered in tandem with the reference model, such as in a weighted ensemble of models, in which each model may be weighted, for example, according to the evaluation(s) of that model. In this case, the edge nodes at which the model(s) operate may be required to possess sufficient processing capabilities to hold multiple models in operation.

In a final example approach, it may be determined that none of the shadow models will provide acceptable performance, and an embodiment may thus trigger the re-training and re-deployment of a new model such as a modified version of $M_A$, that is, in the case in which $M_A$ degrades but no alternative models prove to be useful. The re-training and re-deployment may be applied in combination with the supplanting approach or the ensemble approach, as the triggering of a new training round is a separate concern to the usage of the models for inferencing.

D. Further Discussion

As will be apparent from this disclosure, one or more example embodiments may possess various useful features and advantages. A non-exhaustive list of such features and advantages follows.

An embodiment may implement the orchestration of alternative models for efficient determination of one or more shadow models, which may be based on the baseline evaluation of the model performances over available historical dataset. An embodiment may provide for consideration of a non-redundant set of alternative models in online fashion thus leveraging an online process for determining a most-likely accurate alternative model to be deployed as a shadow model. This determination may be based, for example, on a comparison of baseline performances and a forecast of the evaluation of the reference model in the near future.

E. Example Methods

It is noted with respect to the disclosed methods, including the example methods of FIGS. 2 and 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

In an embodiment, the methods 200 and/or 600 may be performed by a central node that is configured to communicate with one or more edge nodes. Briefly, for example, a central node may evaluate and/or modify one or more models, and then deploy the models to one or more edge nodes. The central node and the edge nodes may each comprise hardware and/or software. In an embodiment, an edge node may comprise a sensor configured to obtain information about a physical operating environment, such as a warehouse for example. An edge node may comprise an autonomous vehicle. No particular configuration is required to implement any embodiment however, and the foregoing are provided only by way of example, and not limitation of the scope of the invention.

Following are some further example embodiments of the invention. These are presented only by way of example and are not intended to limit the scope of the invention in any way.

Embodiment 1. A method, comprising: obtaining, by a central node, an evaluation of a performance of a reference model deployed at an edge node; determining if the evaluation exceeds a threshold associated with the reference model, and incrementing a counter when the evaluation exceeds the threshold; when a counter value equals or exceeds a specified limit, performing an interpolation process to identify a new model having better expected performance than performance of the reference model; and deploying the new model in a shadow mode at the edge node.

Embodiment 2. The method as recited in any preceding embodiment, wherein the reference model is configured to perform anomaly detection with respect to operation of an edge device that comprises the edge node.

Embodiment 3. The method as recited in any preceding embodiment, wherein the reference model and the new model were trained with different respective domain-specific datasets.

Embodiment 4. The method as recited in any preceding embodiment, wherein a threshold associated with the new model is different from the threshold associated with the reference model.

Embodiment 5. The method as recited in any preceding embodiment, wherein deploying the new model in shadow mode comprises running the new model together with the reference model at the edge node.

Embodiment 6. The method as recited in any preceding embodiment, wherein a group of alternative models reside at the edge node, and the new model is taken from the group of alternative models.

Embodiment 7. The method as recited in any preceding embodiment, wherein the evaluation does not exceed the threshold, a series is updated to include the evaluation, and the counter is set to zero.

Embodiment 8. The method as recited in any preceding embodiment, wherein the interpolation process comprises interpolating from a reference point p over a number z of most recent evaluations that have exceeded the threshold.

Embodiment 9. The method as recited in any preceding embodiment, wherein the interpolation process generates a forecast of an evaluation that is above the threshold associated with the reference model.

Embodiment 10. The method as recited in any preceding embodiment, wherein drift in the reference model is indicated when the counter value equals or exceeds the specified limit.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
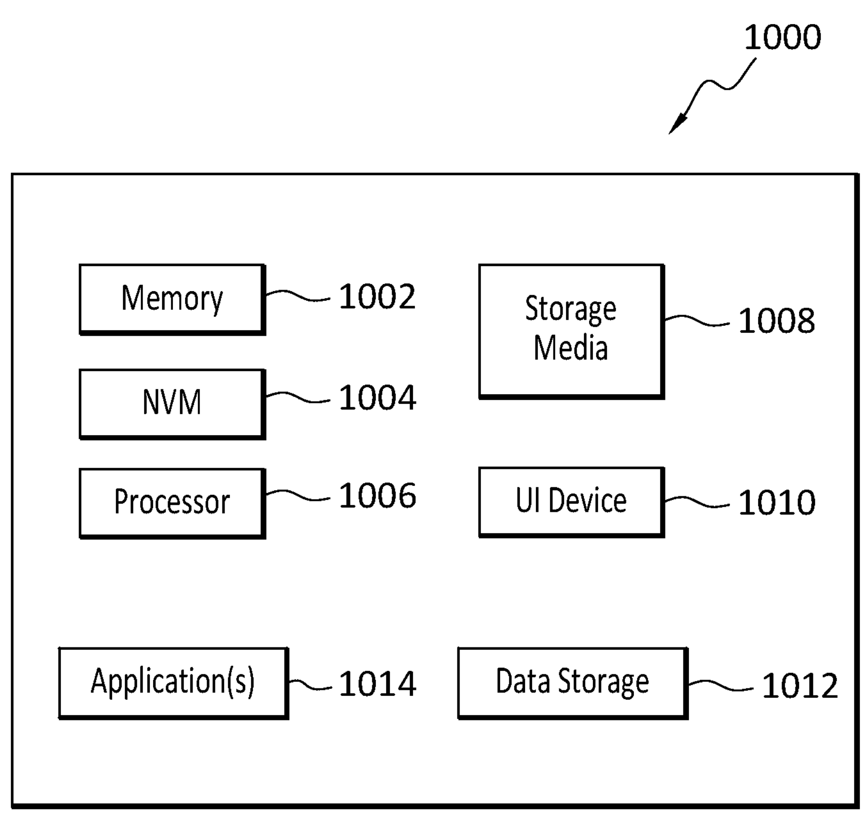
FIG. 10 discloses an example computing entity configured and operable to perform any of the disclosed methods, processes, and operations.

With reference briefly now to FIG. 10, any one or more of the entities disclosed, or implied, by FIGS. 1-9, and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

obtaining, by a central node, an evaluation of a performance of a reference model deployed at an edge node over data collected from the edge node;

removing alternative models from a restricted set of candidate models, wherein the alternative models have evaluations, of which performances over the data are similar to the evaluation of the performance of the reference model;

determining if the evaluation exceeds a threshold associated with the reference model, and incrementing a counter when the evaluation exceeds the threshold;

when a counter value equals or exceeds a specified limit:

performing, by the reference model, an interpolation process to forecast evaluations in future instances; and identifying a new model, of which a respective threshold is greater than or equal to the forecasted evaluations, from the restricted set; and deploying the new model in a shadow mode at the edge node.

2. The method as recited in claim 1, wherein the reference model is configured to perform anomaly detection with respect to operation of an edge device that comprises the edge node.

3. The method as recited in claim 1, wherein the reference model and the new model were trained with different respective domain-specific datasets.

4. The method as recited in claim 1, wherein a threshold associated with the new model is different from the threshold associated with the reference model.

5. The method as recited in claim 1, wherein deploying the new model in shadow mode comprises running the new model together with the reference model at the edge node.

6. The method as recited in claim 1, wherein a group of alternative models reside at the edge node, and the new model is taken from the group of alternative models.

7. The method as recited in claim 1, wherein the evaluation does not exceed the threshold, a series is updated to include the evaluation, and the counter is set to zero.

8. The method as recited in claim 1, wherein the interpolation process comprises interpolating from a reference point p, which is a most recent evaluation that has not exceeded the threshold, over consecutive z evaluations that have exceeded the threshold after the reference point p.

9. The method as recited in claim 1, wherein the interpolation process comprises performing an extrapolation of the forecasted evaluations that are above the threshold associated with the reference model.

10. The method as recited in claim 1, wherein drift in the reference model is indicated when the counter value equals or exceeds the specified limit.

11. A non-transitory storage medium having stored therein instructions that are executable by one or more hardware processors to perform operations comprising:

obtaining, by a central node, an evaluation of a performance of a reference model deployed at an edge node over data collected from the edge node;

removing alternative models from a restricted set of candidate models, wherein the alternative models have evaluations, of which performances over the data are similar to the evaluation of the performance of the reference model;

determining if the evaluation exceeds a threshold associated with the reference model, and incrementing a counter when the evaluation exceeds the threshold;

when a counter value equals or exceeds a specified limit;

performing, by the reference model, an interpolation process to forecast evaluations in future instances; and identifying a new model, of which a respective threshold is greater than or equal to the forecasted evaluations, from the restricted set; and deploying the new model in a shadow mode at the edge node.

12. The non-transitory storage medium as recited in claim 11, wherein the reference model is configured to perform anomaly detection with respect to operation of an edge device that comprises the edge node.

13. The non-transitory storage medium as recited in claim 11, wherein the reference model and the new model were trained with different respective domain-specific datasets.

14. The non-transitory storage medium as recited in claim 11, wherein a threshold associated with the new model is different from the threshold associated with the reference model.

15. The non-transitory storage medium as recited in claim 11, wherein deploying the new model in shadow mode comprises running the new model together with the reference model at the edge node.

16. The non-transitory storage medium as recited in claim 11, wherein a group of alternative models reside at the edge node, and the new model is taken from the group of alternative models.

17. The non-transitory storage medium as recited in claim 11, wherein the evaluation does not exceed the threshold, a series is updated to include the evaluation, and the counter is set to zero.

18. The non-transitory storage medium as recited in claim 11, wherein the interpolation process comprises interpolating from a reference point p, which is a most recent evaluation that has not exceeded the threshold, over consecutive z evaluations that have exceeded the threshold after the reference point p.

19. The non-transitory storage medium as recited in claim 11, wherein the interpolation process comprises performing an extrapolation of the forecasted evaluations that are above the threshold associated with the reference model.

20. The non-transitory storage medium as recited in claim 11, wherein drift in the reference model is indicated when the counter value equals or exceeds the specified limit.

* * * * *